(12) United States Patent
Donhauser et al.

(10) Patent No.: US 8,514,698 B2
(45) Date of Patent: Aug. 20, 2013

(54) ROUTING AND FORWARDING OF PACKETS OVER A NON-PERSISTENT COMMUNICATION LINK

(75) Inventors: John C. Donhauser, Federal Way, WA (US); Paul R. Norris, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 363 days.

(21) Appl. No.: 11/941,917

(22) Filed: Nov. 16, 2007

(65) Prior Publication Data

US 2008/0117927 A1      May 22, 2008

Related U.S. Application Data

(60) Provisional application No. 60/860,303, filed on Nov. 21, 2006.

(51) Int. Cl.
*G08C 15/00*    (2006.01)
*H04L 12/26*    (2006.01)
*H04L 12/28*    (2006.01)
*H04L 12/56*    (2006.01)

(52) U.S. Cl.
USPC ................. 370/229; 370/351; 370/392

(58) Field of Classification Search
None
See application file for complete search history.

(56) References Cited

U.S. PATENT DOCUMENTS

| | | | |
|---|---|---|---|
| 2002/0122394 A1* | 9/2002 | Whitmore et al. | 370/328 |
| 2003/0115480 A1* | 6/2003 | McDysan | 713/201 |
| 2004/0078799 A1* | 4/2004 | Koning et al. | 719/313 |
| 2005/0074019 A1* | 4/2005 | Handforth et al. | 370/406 |
| 2005/0147076 A1* | 7/2005 | Sadowsky et al. | 370/343 |
| 2005/0201340 A1* | 9/2005 | Wang et al. | 370/337 |
| 2006/0203804 A1* | 9/2006 | Whitmore et al. | 370/352 |

* cited by examiner

*Primary Examiner* — Chirag Shah
*Assistant Examiner* — Ashley Shivers
(74) *Attorney, Agent, or Firm* — Hugh P. Gortler

(57) ABSTRACT

According to an embodiment, an apparatus includes a table, a router module and a driver. The table includes IP addresses and corresponding ports. At least one of the ports specifies a logical link. The router module receives IP packets and uses the table to associate the IP packets with the ports. The driver determines when assets for the logical link have become available, and then forwards associated IP packets to the available assets.

13 Claims, 4 Drawing Sheets

ROUTING AND FORWARDING OF PACKETS OVER A NON-PERSISTENT COMMUNICATION LINK

This application claims the benefit of provisional application 60/860,303 filed Nov. 21, 2006, which is incorporated herein by reference.

BACKGROUND

A typical router receives an Internet Protocol (IP) packet, uses a router table to look up a port corresponding to a router interface, and immediately forwards the IP packet to that router interface. In a network having a fixed infrastructure, the router interface sends the IP packet along a persistent communication link to a network destination.

Not all networks have a fixed infrastructure. A wireless ad-hoc network is a computer network in which the communication links are wireless and dynamic. The network is ad hoc because the nodes dynamically join and leave the network, and so the determination of which nodes forward data is made dynamically based on network connectivity. Types of wireless ad-hoc networks include Mobile ad hoc networks (MANets) and wireless mesh networks.

SUMMARY

According to an embodiment of the present invention, an apparatus includes a table, a router module and a driver. The table includes IP addresses and corresponding ports. At least one of the ports specifies a logical link. The router module receives IP packets and uses the table to associate the IP packets with the ports. The driver determines when assets for the logical link have become available, and then forwards associated IP packets to the available assets.

According to another embodiment, a terminal includes a router interface, a router module for receiving incoming IP packets and routing the incoming IP packets to a port associated with a logical link, and a driver for the logical link. The driver determines when assets of the router interface have become available so the IP packets can be sent to a network destination via the logical link. The driver forwards the IP packets to the available assets.

According to yet another embodiment, a method of routing an IP packet includes receiving the IP packet, and routing the packet, which includes identifying the port to which the packet will be forwarded. The method further includes refraining from forwarding the packet when assets for a logical link identified by the port are unavailable, and forwarding the IP packet when the assets for the logical links are available.

One or more embodiments address a problem of routing IP packets across a network where the communication links are non-persistent. In addition, they allow for a commercial router to be used instead of a custom designed router. Algorithms and interfaces for the assets can be embedded in the driver.

DETAILED DESCRIPTION

Figure 1:
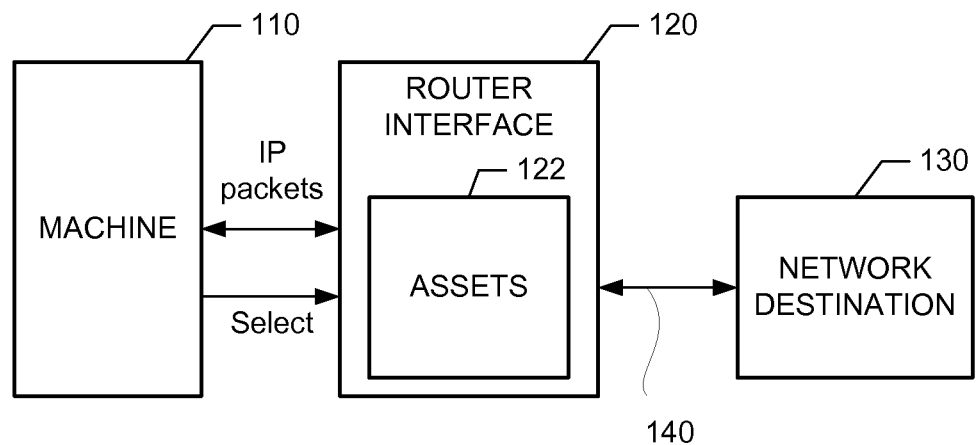
FIG. 1 is an illustration of a system in accordance with an embodiment of the present invention.

Reference is made to FIG. 1, which illustrates a machine 110 that communicates with a router interface 120 by sending and receiving message packets according to the well-known Internet protocol (IP). According to this protocol, the machine 110 receives IP packets from the router interface 120, and routes the incoming IP packets based on the packets' IP addresses.

The machine 110 forwards IP packets to the router interface 120. The router interface 120 includes assets 122, which send IP packets to network destinations 130. A network destination 130 may be a simple IP device (e.g., a webcam, a personal computer), another router, or any other IP device that can communicate over an IP network.

The router interface 120 sends IP packets to network destinations via one or more communication links. A communication link refers to that portion between the router interface 120 and a network destination 130. The communication links in FIG. 1 are represented by the double-arrowed line 140.

The router interface 120 includes pools of assets 122. Assets 122 refer to the hardware that sends packets out of the machine 110. The machine 110 selects certain assets 122 and configures the selected assets 122 to send IP packets to network destinations over communication links 140.

Some assets 122 send IP packets to network destinations 130 over communication links that are non-persistent. Non-persistent communications links are referred to as "logical links." Examples of assets for logical links include time, antennas, modems, and up-down converters. Attributes of a logical link may include specific time slots and specific antennas. Other examples of attributes include, without limitation, data rate, type of RF modulation, and center RF frequency (which are set in a modem), power level (which is set in an up/down converter), the number of time slots that can be used for a logical link, those time slots that are used to transmit IP packets and those that are used to receive IP packets.

Other assets 122 send IP packets to network destinations 130 over communication links 140 that are persistent. Persistent communication links are referred to as physical links. Assets for physical links include, for example, an Ethernet chip set.

Logical links are dynamic. A logical link might vary temporally. For example, time slot assignments are a critical part of Time Division Multiple Access (TDMA)-based communications networks because each node is assigned time slots in which it can transmit or receive packets. In modern wireless networks, the TDMA time slots are assigned to each node. The time slots can vary dynamically. Consequently, an asset such as a time might not be available until the slots are assigned.

A logical link might vary spatially. Consider directional antenna hardware on a mobile platform. The directional antenna hardware includes multiple antennas, up-down converters, transceivers, etc. Since the location and orientation of the platform can vary dynamically, assets such as antennas aren't selected until the location and orientation of the platform has been determined.

The machine 110 takes these dynamics into account. The machine 110 receives IP packets, and immediately routes the packets. However, the machine 110 does not forward IP packets to the router interface 120 until it determines that assets have become available to support a logical link with a network destination. In this manner, the machine 110 refrains from forwarding IP packets when assets for a logical link identified by the port are unavailable. Once the assets have become available (e.g., once the assets have been selected), the machine 110 forwards IP packets to the selected assets 122. The selected assets 122 then send the IP packets via a logical link to a network destination 130.

Figure 2:
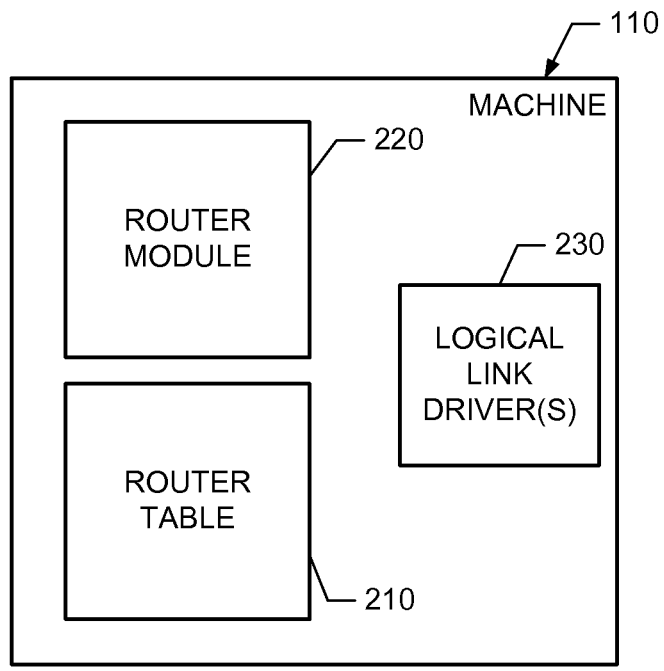
FIG. 2 is an illustration of a machine in accordance with an embodiment of the present invention.

Reference is made to FIG. 2, which illustrates an exemplary machine 110. As used herein, the term exemplary indicates an example and not necessarily an ideal. The machine 110 includes a router table 210. The router table 210 includes a plurality of entries, each entry containing an IP address and a corresponding port. Each port specifies a communication link. A physical port specifies a physical link, and a logical link port specifies a logical link.

Figure 3:
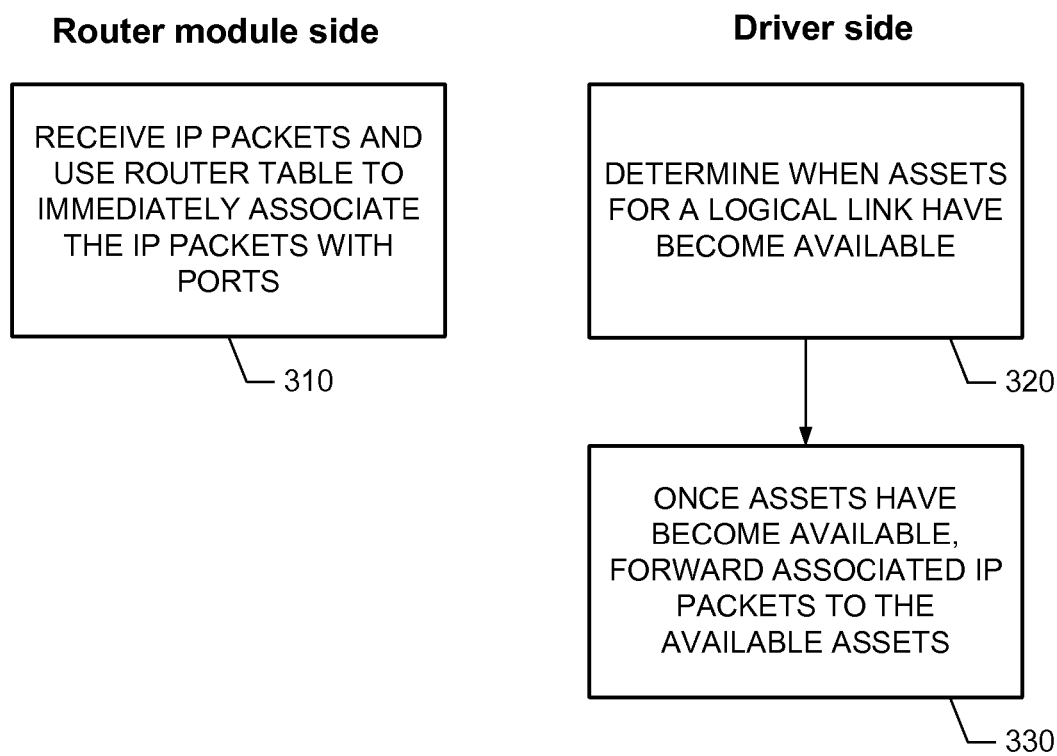
FIG. 3 is an illustration of a method in accordance with an embodiment of the present invention.

Additional reference is made to FIG. 3. When a packet is received by the machine 110, the packet may be stored in a reserved memory location. A router function is called, whereby a router module 220 uses the router table 210 to immediately associate the IP packets with ports (block 310). The router module 220 may look up a port in the router table 210 based on the packet's IP address.

The router module 220 may create a pointer to the memory location where the packet is stored. The packet pointer is then passed to a driver associated with the port. The router module 220 also populates the router table 210 with ports. Such routing may be performed in a conventional manner. The router module 220 may be implemented either in hardware or software. Commercial off-the-shelf router hardware or software (or both) may be used.

The machine 110 further includes at least one logical link driver 230. A logical link driver 230 driver determines when assets for its logical link have become available (block 320). This function may include selecting certain assets for the logical link, and configuring the selected assets to send framed packets via the logical link. A logical link driver 230 may also maintain the attributes of the assets for its logical link.

Once assets have become available, the driver 230 forwards associated IP packets to the available assets (block 330). The available assets then send framed packets over the logical link.

Thus, the machine 110 addresses a problem of routing IP packets across a network where the communication links are non-persistent. Moreover, the router module 220 does not need to know the difference between conventional physical link drivers and logical link drivers 230. The router module 230 simply maps ports to IP addresses. To the router module 220, a logical link driver is just another driver. This allows the router module 220 to be a commercial router instead of a custom designed router. In addition, the router module 220 can be upgraded without having to redesign the drivers. And since the router module 220 doesn't have to differentiate between ports for physical links and ports for logical links, the algorithms and interfaces for the assets can be embedded in the logical link driver 230. This may include algorithms and interfaces that operate in the time/space/frequency/multi-antenna domain.

The machine 110 is not limited to any particular type or use. The machine 110 may be a standalone unit or it may be integrated in a larger system. Examples include, without limitation, routers and terminals.

Figure 4:
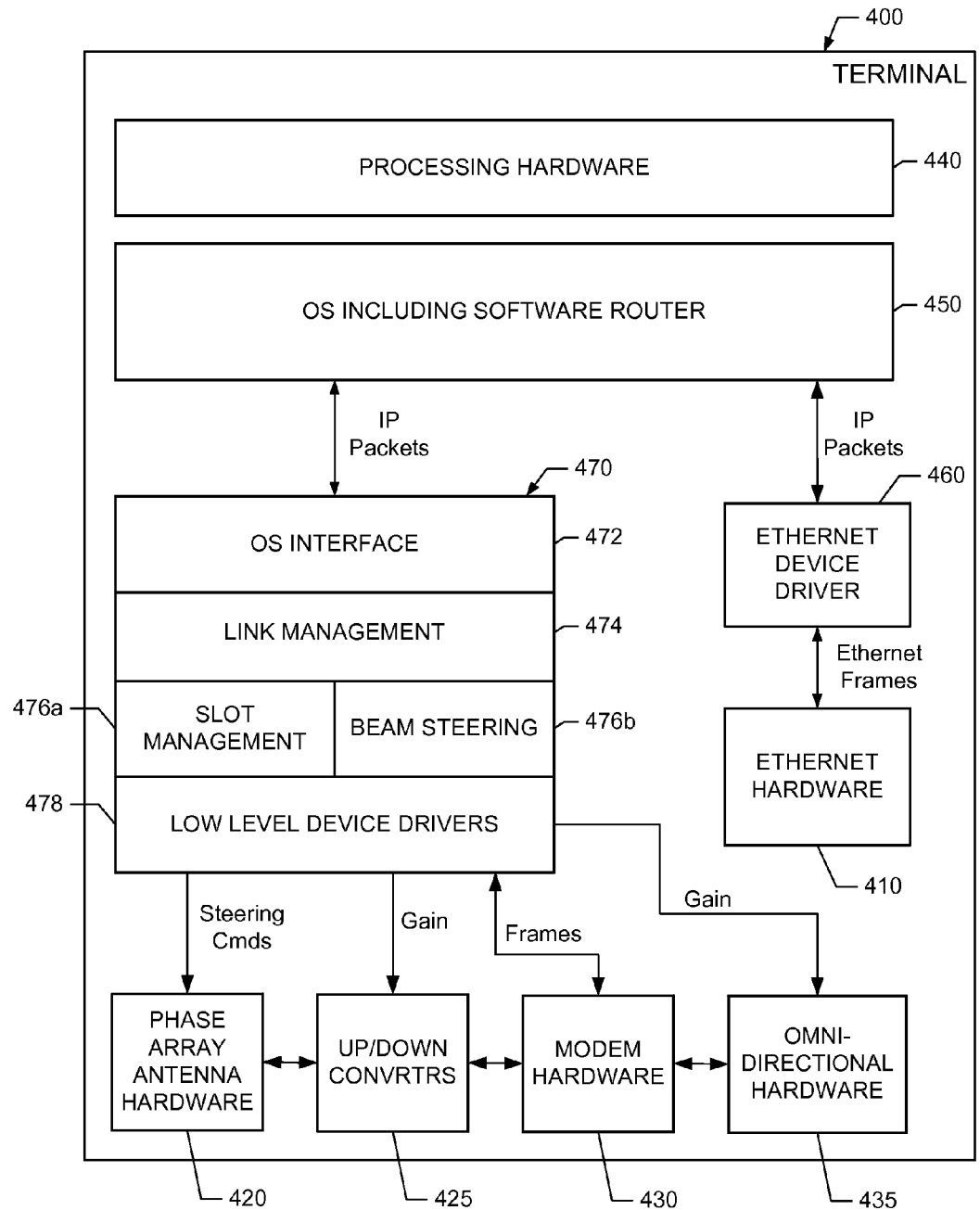
FIG. 4 is an illustration of a terminal in accordance with an embodiment of the present invention.

Reference is made to FIG. 4, which illustrates an exemplary terminal 400. The terminal 400 includes a router interface. Assets for physical links include Ethernet hardware 410.

For example, the Ethernet hardware 410 might include chipsets for a 100 Mb Ethernet and two Gigabit Ethernets. The Ethernet hardware 410 is part of a fixed infrastructure that, for instance, allows the terminal 400 to connect to a laptop computer, a GPS device, an inertial navigation system, a web camera, a fixed router acting as a gateway to another network, or some other network device.

Assets for logical links may include time and antenna terminal units (ATUs). An ATU includes a phased array antenna 420, up/down converter 425, omni-directional antenna 435, and modem 430. A phased array antenna 420 includes an antenna aperture and a beam steering controller.

For directional communication, a selected modem 430 transmits and receives radio frames and exchanges a modulated radio signal (e.g., a 5 GHz signal) with a selected up/down converter 425. The selected up/down converter 425 exchanges a modulated radio signal (e.g., a 15 GHz signal) with a selected phased antenna array 420. The selected phased array antenna 420 is controlled in response to gain and steering commands.

For omni-directional communication, a selected modem 430 receives radio frames and exchanges a modulated radio signal with an omni-directional antenna 435. The omni-directional antenna 435 also receives gain commands.

The terminal 400 includes processing hardware 440 (e.g., an embedded computer including a CPU and system memory) that runs an operating system (OS) 450. The operating system 450 may include a protocol stack such as a transmission control protocol/Internet protocol (TCP/IP) stack (or the operating system may run a different protocol stack). The operating system 450 may include a software router. In the alternative, a software router may be an application that runs on the operating system 450.

Additional applications that run on the operating system 450 include physical link drivers and logical link drivers. The physical link drivers may include an Ethernet device driver 460, which provides Ethernet frames to the Ethernet hardware 410. The logical link drivers include a radio frequency (RF) driver 470 for providing frames to the modem hardware 430, gain commands to the up/down converters 425, steering commands to the phased array antenna hardware 420, and gain commands to the omni-directional hardware 440.

The RF driver 470 includes an OS interface 472 for receiving IP packets from, and sending IP packets to, the operating system 450. The RF driver 470 may be a layer-2 function and a layer-1 control function in the OSI model. Accordingly, a driver instance exchanges IP packets with an OSI Layer-3 IP Stack.

The RF driver 470 further includes link management 474 for encapsulating the IP packets with the RF driver's unique link layer information to produce link layer frames. This unique information might include position (latitude, longitude and altitude) which a peer terminal will use along with its attitude to steer a phased array antenna beam towards the terminal 400. The link management 474 may also save the peer terminal's position information.

The RF driver 470 further includes slot management 476a, beam steering 476b, and low level device drivers 478. The slot management 476a assigns time slots to the logical links. The beam steering 476b determines the location of peer terminals to make a just-in-time decision in selecting an antenna from the antenna hardware 420, and it computes a pointing vector from the face of the selected antenna.

The low level device drivers 478 formulate commands and send the commands to the selected assets. In addition, a low level serial bus (e.g., RS422) driver may be used to communicate with an Inertial Navigation System, and a bus (e.g., PCI) driver may be used to talk to the timing card that gives us an interrupt when at the edge of a time slot.

The router interface may be expanded simply by adding a link (e.g., a new I/O device) and installing the appropriate driver. No additional changes are needed for routing the IP packets.

The terminal 400 may be used in any IP network, including a wireless "hub and spoke" network. However, the terminal 400 is especially suitable for an ad hoc mobile IP network of terminals, where the terminal 400 functions as a mobile router. This type of network does not have a fixed infrastructure of IP routers. The mobile routers come and go and are constantly changing position. For instance, a terminal 400 may be carried by a land vehicle, aircraft or other mobile platform.

The terminal may be a part of a DNW, which is an ad hoc network of terminals that use TDMA communication. The DNW has the topology of a mesh network, where terminals 400 are interconnected via logical links.

A DNW terminal may have the following modes of operation: TDMA communication with an omni-directional antenna, and TDMA communication with a directional antenna. A directional antenna can provide additional gain for increased performance on transmit and receive and reduced interference from unwanted sources. The RF driver 470 constructs a DNW waveform in conjunction with the selected assets. The directional antenna just adds a layer of complexity to the RF driver 470. Not only does the RF driver 470 deal with time slot coordination, but it also deals with the location of the peer terminals and the location and attitude of its own terminal to make a just-in-time decision in selecting assets.

Figure 5:
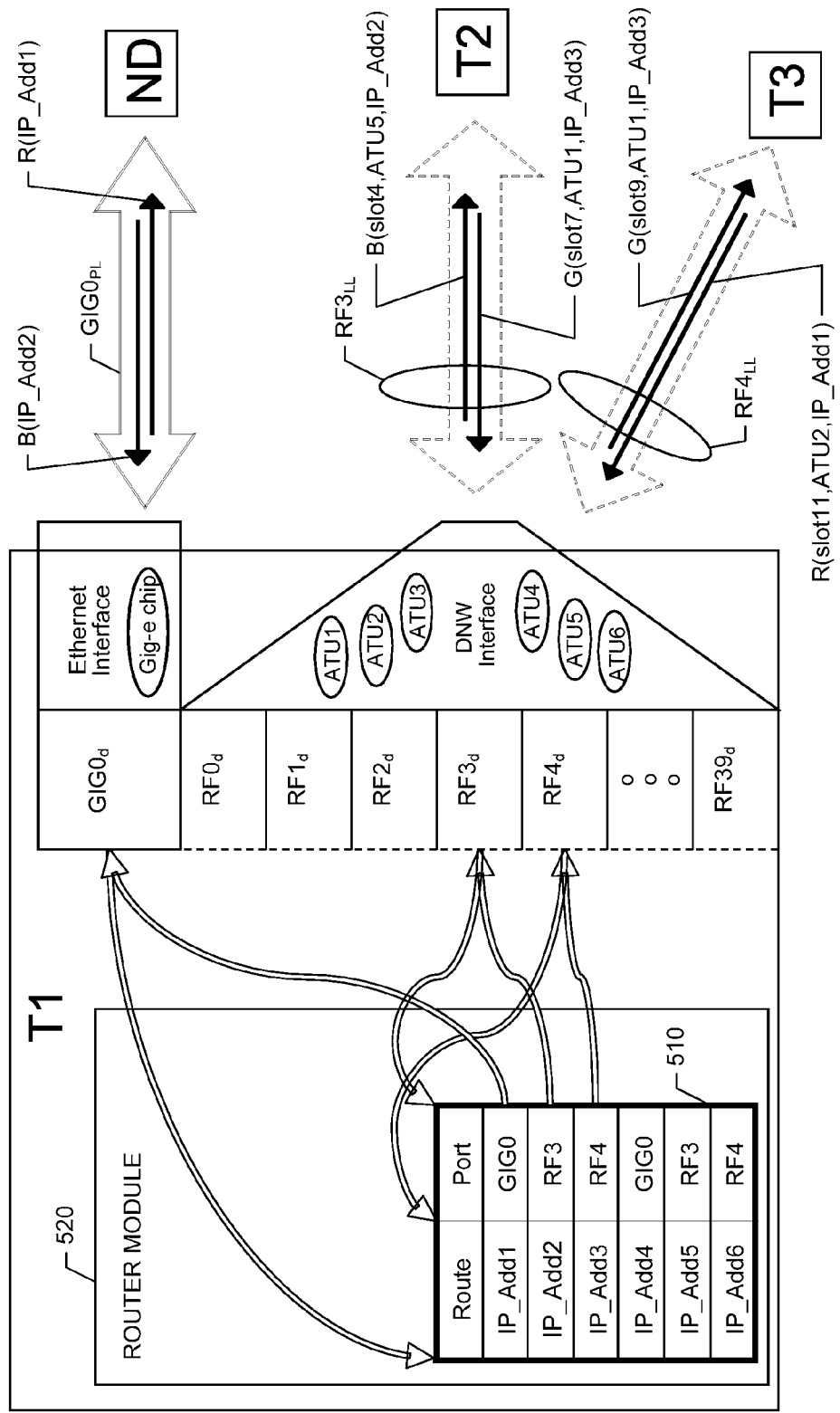
FIG. 5 is an illustration of runtime operation of a Directional Network Waveform (DNW) terminal in accordance with an embodiment of the present invention.

Reference is now made to FIG. 5, which illustrates runtime operation of DNW terminals T1, T2 and T3. Within each terminal, each driver can have one or more instantiations in order to service multiple ports of the same device type. For example, a single instance of a Gigabit Ethernet driver and a pool of RF driver instances can be created for each terminal. The first terminal T1 illustrates the availability of one gigabit Ethernet port (GIG0) and ports for forty logical links (RF0 through RF39), where more than one of those logical links could be active simultaneously.

In the examples that follow, the following notation will be used. Subscript d following a port refers to a driver instance corresponding to that port, subscript LL following a port refers to a logical link corresponding to that port, and subscript PL following a port refers to a physical link corresponding to that port. An arrow pointing toward the terminal T1 indicates a received packet, and an arrow pointing away from the terminal T1 indicates a transmitted packet.

Logical links $RF3_{LL}$ and $RF4_{LL}$ are established between terminal T1 and its peer terminals T2 and T3. As these logical links $RF3_{LL}$ and $RF4_{LL}$ are established, IP addresses of the network devices connected to the peer terminals T2 and T3 are added to terminal T1's router table 510 along with associated ports. In this manner, the router table 510 is populated. The ports in the router table 510 of FIG. 5 show three active communication links $GIG0_{PL}$, $RF3_{LL}$ and $RF4_{LL}$ at ports GIG0, RF3 and RF4. The other thirty eight logical links are idle and will remain so until such time as logical links are desired with additional terminals, at which time, time-slots will be assigned to those logical links.

Time might be the first asset that becomes available. For example, time becomes available when a time slot associated with a logical link arrives. The remaining assets of the DNW interface (e.g., an ATU) are then dynamically selected by an RF driver instance. After the assets have been selected, the logical link driver instance generates gain and beam steering commands, and outputs link layer frames to the selected ATU.

Consider the following additional examples. Packet B with destination address IP_Add2 is received on the Gigabit Ethernet and routed to port RF3, which specifies an instance $RF3_d$ of the RF driver. Once assets become available, the RF driver instance $RF3_d$ forwards packet B to terminal T2 in time slot 4 over logical link $RF3_{LL}$ using antenna terminal unit ATU5.

A packet G with destination address IP_Add3 is received by terminal T1 over logical link $RF3_{LL}$ in time slot 7 using antenna terminal unit ATU1. RF driver instance $RF3_d$ receives packet G and sends it to the router module 520, where it is routed to driver instance $RF4_d$. Once assets become available, driver instance $RF4_d$ forwards packet G in time slot 9 to terminal T3 using antenna terminal unit ATU1.

A packet R with destination address IP_Add1 is received over logical link $RF4_{LL}$ in time slot 11 using antenna terminal unit ATU2. RF driver instance $RF4_d$ receives packet G and sends it to the router module 520, where it is routed to driver instance $GIG0_d$. Driver instance GIG0 forwards packet R to network device ND over a physical link $GIG0_{PL}$.

Since the position of either or both terminals in a logical link might change (due, for instance, to being on mobile platforms), neither terminal knows which assets to use at the time the packets are routed. The sending terminal only knows where the IP packets should go logically.

Consider the following example. Terminal T1 has established logical links with peer terminals T2 and T3. Initially, from the perspective of terminal T1, the peer terminals T2 and T3 have a large angle separating them, so time-slot 4 is assigned to both logical links $RF3_{LL}$ and $RF4_{LL}$. Communication from terminal T1 to peer terminal T2 is performed with antenna unit ATU1, and communication to peer terminal T3 is performed using antenna unit ATU4 because those antenna units have peer terminals T2 and T3 in their field of view. Now suppose terminals T2 and T3 suddenly move very close together, such that they are both in the field of view of terminal T1. Only antenna unit ATU1 has both terminals T2 and T3 in its field of view. Therefore, either terminal T2 or terminal T3 will get starved out for lack of assets. Consequently, one terminal T2 or T3 will get some packets in slot 4, and the other terminal will get nothing. Packets that have been routed to the "starved" terminal won't get lost. They will stay "queued" by the RF driver instance $RF3_d$ or $RF4_d$ until another time slot assigned to the associated logical link arrives, and a "free" ATU can be found.

Although specific embodiments of the present invention have been described and illustrated, the present invention is not limited to the specific forms or arrangements of parts so described and illustrated. Instead, the present invention is construed according to the following claims.

The invention claimed is:

1. An apparatus comprising:
a memory storing a table including Internet protocol (IP) addresses and corresponding ports, at least one of the ports specifying a logical link;
a router module for receiving IP packets and using the table to associate the IP packets with the ports, wherein the router module does not differentiate between ports specifying physical links and ports specifying logical non-persistent links; and
a driver including an operating system (OS) interface, link management, slot management, beam steering controllers, and algorithms that operate in a time, space, frequency and multi-antenna domain for determining when assets for the logical link have become available, refraining from forwarding associated IP packets to the assets if the assets are not available, and then forwarding the associated IP packets to the assets once the assets have become available.

2. The apparatus of claim 1, wherein determining when the assets become available includes selecting the assets for the logical link.

3. The apparatus of claim 1, wherein the router module also populates the table with ports that are associated with logical links.

4. The apparatus of claim 1, wherein the logical link varies at least one of temporally or spatially.

5. The apparatus of claim 1, further comprising a router interface.

6. The apparatus of claim 5, wherein assets of the router interface include a pool of antenna terminal units; and wherein the driver selects among those antenna terminal units.

7. A terminal comprising:
a router interface including a plurality of assets;
a router module for receiving incoming Internet protocol (IP) packets and routing the incoming IP packets to a port associated with a logical link; and
a driver for the logical link, the driver including an operating system (OS) interface, link management, slot management, beam steering controllers, and algorithms that operate in a time, space, frequency and multi-antenna domain for determining when assets have become available so the IP packets can be sent to a network destination via the logical link, the driver forwarding the IP packets to the available assets.

8. The terminal of claim 7, wherein the algorithms and interfaces for the assets are embedded in the driver.

9. The terminal of claim 7, wherein the assets include a plurality of antenna terminal units.

10. The terminal of claim 9, wherein the assets further include time.

11. The terminal of claim 7, wherein the router module uses a table to route the incoming IP packets, the table including IP addresses and ports, the ports specifying at least one logical link.

12. The terminal of claim 7, wherein determining when the assets become available includes selecting the assets for the logical link.

13. The terminal of claim 7, wherein the router interface supports a logical link that varies at least one of temporally or spatially.

* * * * *